(12) United States Patent
Sugie et al.

(10) Patent No.: US 10,026,000 B2
(45) Date of Patent: Jul. 17, 2018

(54) VISUAL LINE DETECTION DEVICE AND VISUAL LINE DETECTION METHOD

(71) Applicant: FUJITSU TEN LIMITED, Kobe-shi, Hyogo (JP)

(72) Inventors: Akira Sugie, Kobe (JP); Shuhei Shibata, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 281 days.

(21) Appl. No.: 15/095,504

(22) Filed: Apr. 11, 2016

(65) Prior Publication Data

US 2016/0358028 A1 Dec. 8, 2016

(30) Foreign Application Priority Data

Jun. 5, 2015 (JP) ................................. 2015-115089

(51) Int. Cl.
*G06K 9/00* (2006.01)
*H04N 17/00* (2006.01)

(52) U.S. Cl.
CPC ..... *G06K 9/00845* (2013.01); *G06K 9/00604* (2013.01); *H04N 17/002* (2013.01)

(58) Field of Classification Search
CPC ........... G06K 9/00845; G06K 9/00604; H04N 17/002
See application file for complete search history.

(56) References Cited

U.S. PATENT DOCUMENTS

| 2014/0078282 | A1* | 3/2014 | Aoki ................ G06K 9/00221 348/78 |
| 2015/0339527 | A1* | 11/2015 | Plummer ........... G06K 9/00845 348/78 |
| 2016/0042240 | A1* | 2/2016 | Takeda ............... G06K 9/00597 382/104 |
| 2016/0342205 | A1* | 11/2016 | Shigeta .................. A61B 3/113 |
| 2017/0153699 | A1* | 6/2017 | Tsuda ..................... G06F 3/013 |

FOREIGN PATENT DOCUMENTS

| JP | H07-35543 A | 2/1995 |
| JP | 2009-015533 A | 1/2009 |

* cited by examiner

*Primary Examiner* — Neil Mikeska
(74) *Attorney, Agent, or Firm* — Oliff PLC

(57) ABSTRACT

A visual line detection device according to an embodiment includes a detection unit, an acquisition unit, a determination unit, a calculation unit, and a calibration unit. The detection unit detects a visual line direction of a driver in a vehicle. The acquisition unit acquires a running state of the vehicle. The determination unit determines whether or not the running state acquired by the acquisition unit is a gazing state where the driver is gazing at a particular position. The calculation unit calculates a representative value for a detection result of the detection unit in a case where the determination unit determines that the running state is the gazing state. The calibration unit executes calibration for detection of the visual line direction by the detection unit in such a manner that the representative value calculated by the calculation unit is a reference thereof.

13 Claims, 13 Drawing Sheets

ACQUIRE WHITE LINE DETECTION RESULT

VEHICLE LONGITUDINAL DIRECTIONS // WHITE LINE DIRECTION

VEHICLE SPEED ≥ SPECIFIED VALUE

DESTABILIZATION REGION

DESTABILIZATION REGION

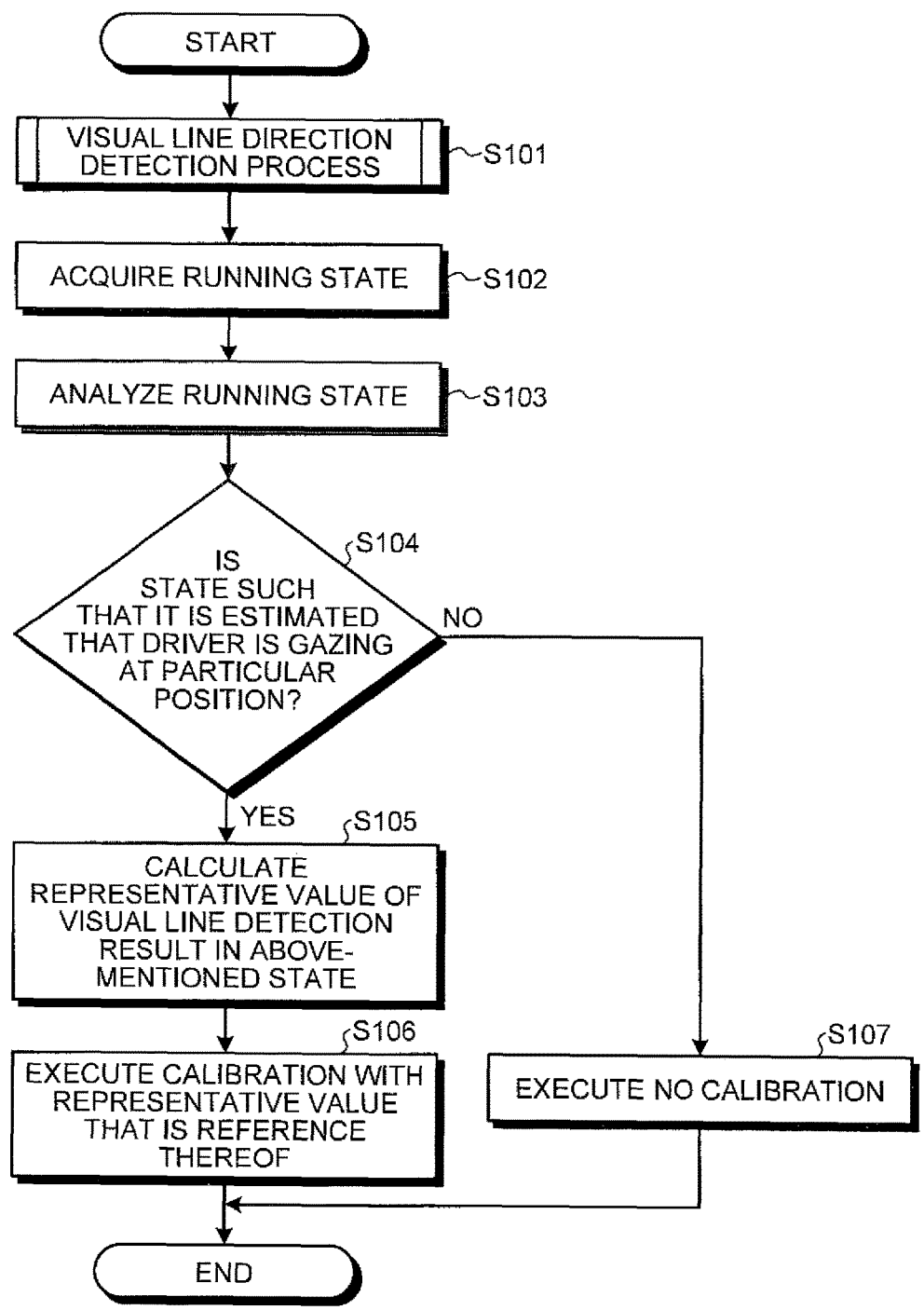

VISUAL LINE DETECTION DEVICE AND VISUAL LINE DETECTION METHOD

CROSS-REFERENCE TO RELATED APPLICATION

This application is based upon and claims the benefit of priority of the prior Japanese Patent Application No. 2015-115089, filed on Jun. 5, 2015, the entire contents of which are incorporated herein by reference.

FIELD

The embodiment discussed herein is directed to a visual line detection device and a visual line detection method.

BACKGROUND

For the purpose of acquiring a driving state or the like of a driver in a vehicle, a technology has conventionally been known for detecting a visual line of a driver and the movement thereof.

For example, Japanese Laid-open Patent Publication No. H07-35543 discloses a technology that displays a marker for calibration in front of a driver in a case where a predetermined switch is pushed by the driver, and executes calibration for detection of a visual line based on a positional relationship between the driver and the marker that is acquired by causing the driver to gaze at such a marker.

However, in the conventional technology described above, an operation of a driver is needed for each calibration, and hence, there is a problem of steps that are complicated and cannot readily be executed.

Furthermore, for calibration, a driver is caused to take a posture for pushing the above-mentioned switch in vehicle interior, and hence, the calibration is executed in a posture different from a posture that is taken by the driver at time of normal driving. Hence, there is a difficulty in executing detection of a visual line of a driver in a running vehicle with high accuracy.

SUMMARY

According to an aspect of an embodiment, a visual line detection device includes a detection unit, an acquisition unit, a determination unit, a calculation unit, and a calibration unit. The detection unit detects a visual line direction of a driver in a vehicle. The acquisition unit acquires a running state of the vehicle. The determination unit determines whether or not the running state acquired by the acquisition unit is a gazing state where the driver is gazing at a particular position. The calculation unit calculates a representative value for a detection result of the detection unit in a case where the determination unit determines that the running state is the gazing state. The calibration unit executes calibration for detection of the visual line direction by the detection unit in such a manner that the representative value calculated by the calculation unit is a reference thereof.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 9A is a flowchart illustrating steps of a process to be executed by a visual line detection device according to an embodiment.

DESCRIPTION OF EMBODIMENTS

In the following, an embodiment of a visual line detection device and a visual line detection method disclosed in the present application will be described in detail, with reference to the accompanying drawings. This invention is not limited to the embodiment described below.

In the following, an outline of a visual line detection method according to the present embodiment will be described by using FIG. 1A to FIG. 1E, and subsequently, a visual line detection device with such a visual line detection method applied thereto will be described by using to FIG. 2 to FIG. 9B.

First, an outline of a visual line detection method according to the present embodiment will be described by using FIG. 1A to FIG. 1E. FIG. 1A to FIG. 1E are diagrams (part 1 to part 5) illustrating an outline of a visual line detection method according to the embodiment.

A visual line detection method according to the present embodiment, unlike a publicly known visual line detection method that is a comparative example, is allowed to execute calibration for visual line detection dynamically in case where a vehicle C is running as well as a case where the vehicle C is stopped.

Calibration for visual line detection to be executed by a publicly known visual line detection method, has been known, where, for example, a driver D is caused to push a predetermined switch so as to display a marker for calibration in a state where the vehicle C is stopped, the driver D is caused to gaze at such a marker to acquire a positional relationship between the driver D and the marker, and the calibration for visual line detection is executed based on the acquired positional relationship.

However, in such a visual line detection method, an operation of the driver D is needed for each calibration, and hence, steps thereof are complicated and cannot readily be executed. Furthermore, a posture taken by the driver D for calibration is a posture for pushing the above-mentioned switch in vehicle interior, and is different from a posture taken by the driver D at time of normal driving. Hence, there is a difficulty in obtaining accuracy for well executing visual line detection for the driver D in the vehicle C that is running.

In a visual line detection method according to the present embodiment, calibration for visual line detection is executed without needing an operation of the driver D in a state where the vehicle C is running and a posture of the driver D is a natural posture at time of normal driving.

Figure 1A:
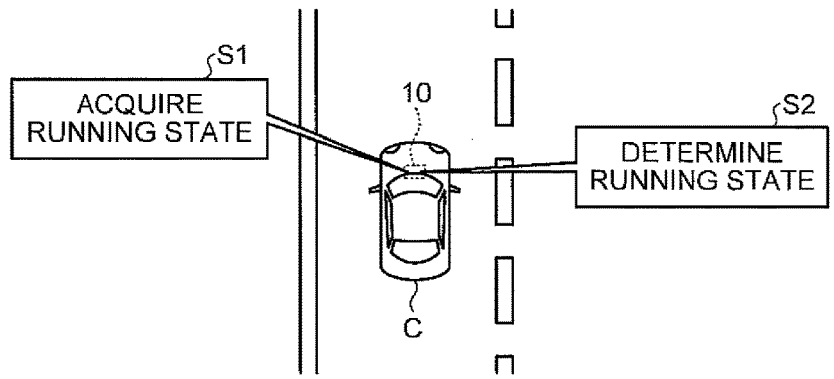
FIG. 1A to FIG. 1E are diagrams (part 1 to part 5) illustrating an outline of a visual line detection method according to an embodiment.

Specifically, first, as illustrated in FIG. 1A, in the present embodiment, a visual line detection device 10 mounted on the vehicle C acquires a running state of the vehicle C that is running (step S1). Then, the visual line detection device 10 determines the acquired running state (step S2).

Figure 1B:
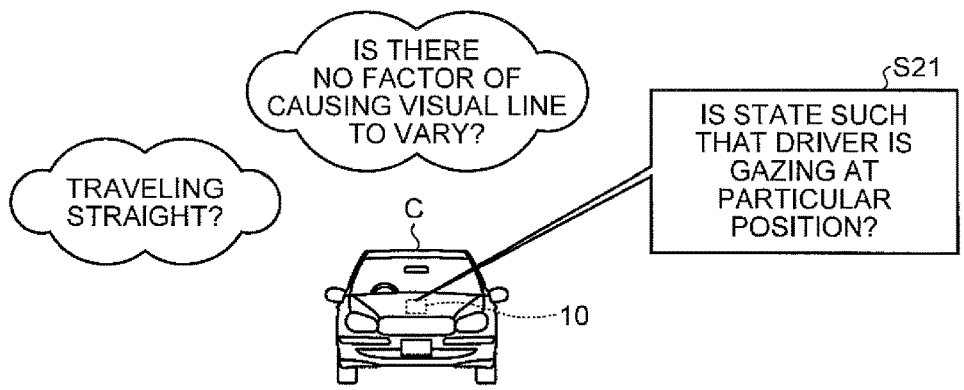

As illustrated in FIG. 1B, a specific content of such determination is whether or not it is estimated that "is the state such that a driver is gazing at a particular position?" (step S21). In the present embodiment, such a "particular position" is a "point at infinity in a front direction of the driver D in a case where it is assumed that the vehicle C is traveling straight on a flat or non-slope and straight road" or a "vanishing point of a road".

That is, in the present embodiment, a state where it is estimated that the driver D is gazing at such a point at infinity (vanishing point) is regarded as a state where the driver D is taking a natural posture at time of normal driving. Therefore, as illustrated in FIG. 1B, whether or not a state is such that it is estimated that the driver D is gazing at a "particular position" is determined at step S21, based on a content of determination as to whether the vehicle C is "traveling straight?" or whether "is there no factor of causing a visual line to vary?" for the driver D. A specific example of step S21 will be described later, by using FIG. 6A to FIG. 7A.

Figure 1C:
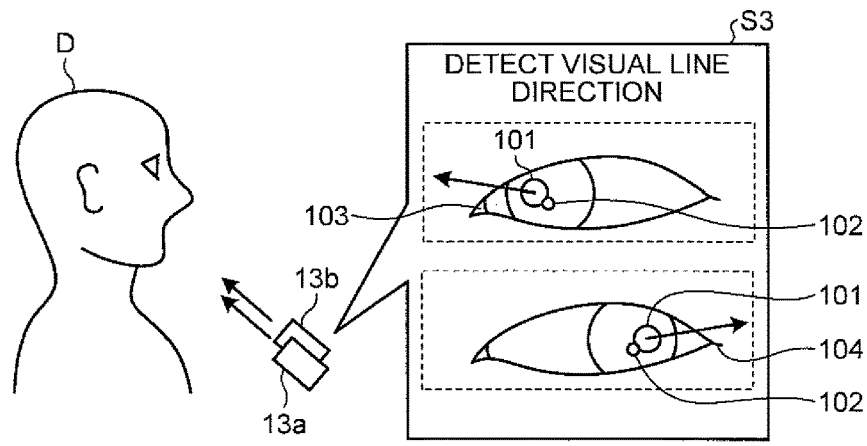

In parallel with such determination, in the present embodiment, the visual line detection device 10 uses an infrared camera 13a and an infrared LED 13b and dynamically and repeatedly executes detection of a visual line direction of the driver D (step S3), as illustrated in FIG. 1C.

Specifically, a visual line direction of the driver D is detected from a positional relationship between a pupil 101 in an infrared image obtained by the infrared camera 13a that takes an image of a face of the driver D illuminated by the infrared LED 13b and an infrared illumination reflection image (corneal reflection 102) produced on an eyeball.

For example, as illustrated in FIG. 1C, if the pupil 101 is present at a side of an inner corner of eye 103 with respect to the corneal reflection 102, it is understood that the driver D is looking at a side of the inner corner of eye 103. For example, if the pupil 101 is present at a side of an outer corner of eye 104 with respect to the corneal reflection 102, it is understood that the driver D is looking at a side of the outer corner of eye 104.

Figure 1D:
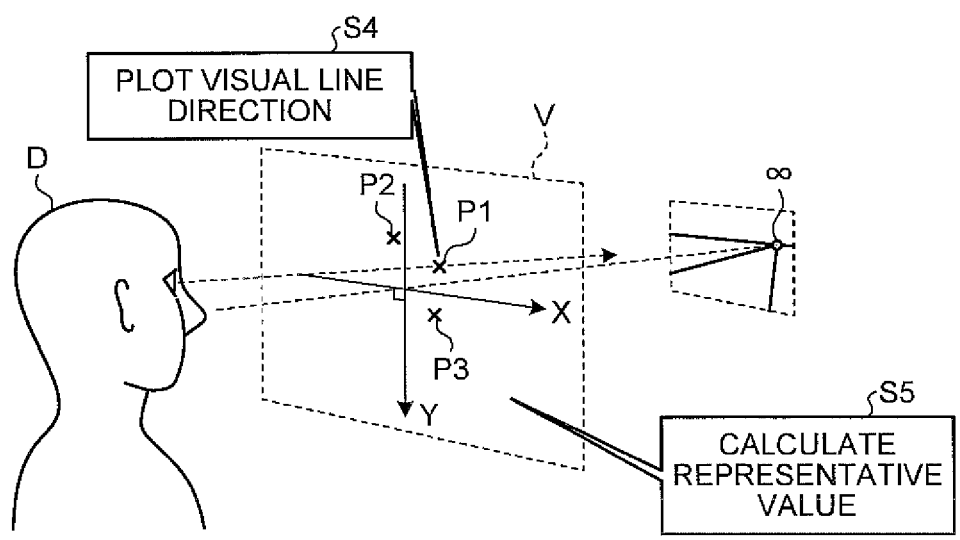

Then, in the present embodiment, in a case where it is determined at step S21 described above that the state is such that it is estimated that the driver D is gazing at a "particular position", a visual line direction detected at step S3 is plotted onto a virtual plane V (step S4) in such a state, as illustrated in FIG. 1D.

The virtual plane V is a virtual plane orthogonal to a straight line that connects the driver D and a point at infinity ∞, while each visual line direction is plotted at a position where a virtual line intersects such a virtual plane V and such a position is indicated by an XY-coordinate system on the virtual plane V. Specific examples of steps S3 to S5 will be described later, by using FIG. 3 to FIG. 5.

Then, the visual line detection device 10 calculates a representative value for such respective plotted points P1 to P3 (three points are illustrated for convenience) (step S5). Such a representative value indicates a center of a distribution of the respective points P1 to P3 and is, for example, an average value of the respective points P1 to P3.

Figure 1E:
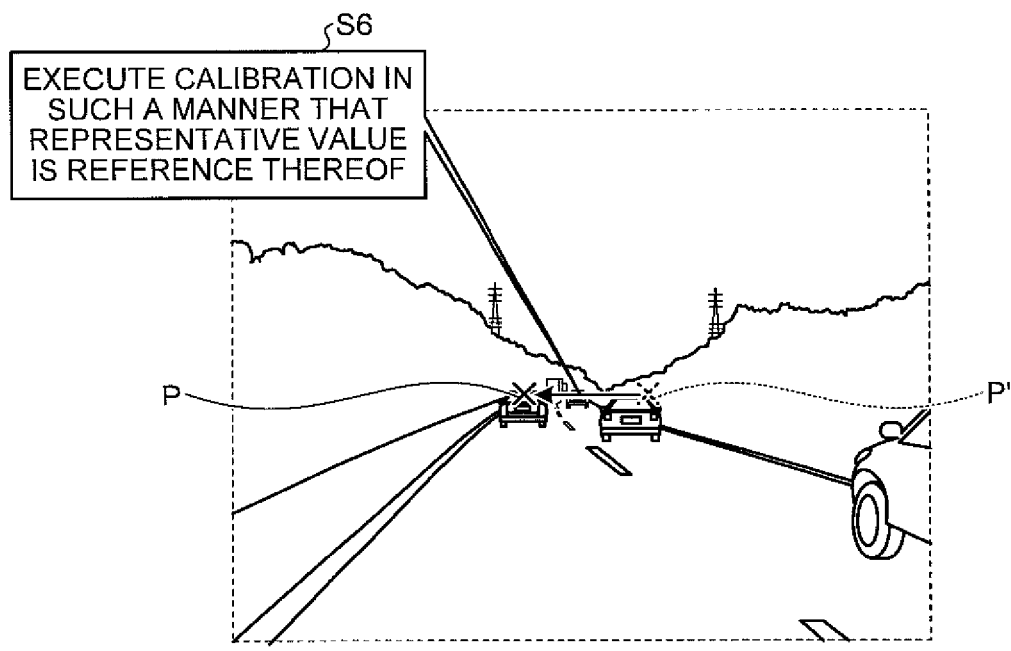

Then, in the present embodiment, the visual line detection device 10 executes calibration in such a manner that the representative value calculated at step S5 is a reference thereof (step S6), as illustrated in FIG. 1E. That is, calibration information in a visual line detectable region of the driver D (information that includes mapping information that indicates a positional relationship between the pupil 101 and the corneal reflection 102) is corrected while the representative value indicates a point at infinity ∞ in a front direction of the driver D.

Thereby, for example, as illustrated in FIG. 1E, if a point at infinity ∞ as originally indicated by a point P' is indicated by a point P on the above-mentioned representative value, calibration information in a case where the driver D looks at a point at infinity ∞ is corrected from the point P' to the point P. Also, all of the above-mentioned mapping information are corrected based on such a representative value.

Thus, in the present embodiment, a running state of the vehicle C is acquired, then it is determined whether or not the acquired running state is a state where it is estimated that the driver D is gazing at a particular position, and in parallel with such determination, a visual line direction of the driver D in the vehicle C is detected dynamically and repeatedly.

Then, in the present embodiment, if it is determined that the acquired running state is a state where it is estimated that the driver D is gazing at a particular position, a representative value for a detection result of a visual line direction of the driver D in such a state is calculated, and calibration for detection of the visual line direction is executed in such a manner that such a representative value is a reference thereof. Therefore, according to the present embodiment, simple and highly accurate visual line detection can be executed.

In the following, the present embodiment with an outline illustrated in FIG. 1A to FIG. 1E will be described specifically and sequentially.

Figure 2:
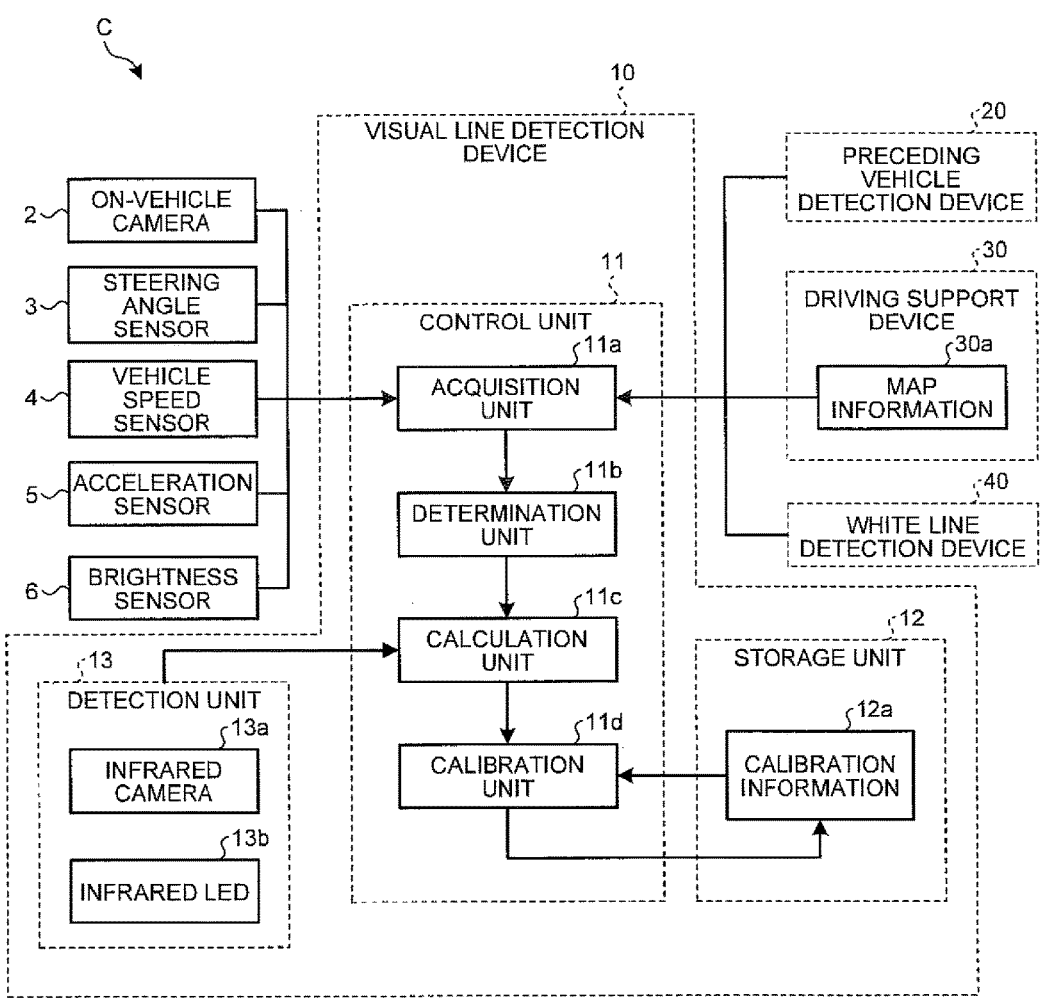
FIG. 2 is a block diagram illustrating a visual line detection device according to an embodiment.

FIG. 2 is a block diagram of the visual line detection device 10 according to the embodiment. In FIG. 2, only components needed for explaining a feature of the present embodiment are represented by functional blocks, and descriptions of general components are omitted.

In other words, each component illustrated in FIG. 2 is functionally conceptual and not necessarily required to be configured physically as illustrated in the drawing. For example, a specific mode of distribution or integration of the respective functional blocks is not limited to that illustrated in the drawing, and it is possible to distribute or integrate all or a part thereof functionally or physically in an arbitrary unit to be configured, depending on various types of loads or usage.

All or a part of respective processing functions to be executed in the respective functional blocks of the visual line detection device 10 can be realized by a processor such as a Central Processing Unit (CPU) and a program to be analyzed and executed by such a processor, or realized as hardware based on wired logic.

As illustrated in FIG. 2, the visual line detection device 10 is provided in the vehicle C. A group of sensors such as an on-vehicle camera 2 capable of taking an image of surroundings of the vehicle C, a steering angle sensor 3 that detects a steering angle of the vehicle C, a vehicle speed sensor 4 that detects a vehicle speed, an acceleration sensor 5 that detects acceleration, and a brightness sensor 6 that detects a change in brightness of surrounding of the vehicle C, other than the visual line detection device 10, are mounted on the vehicle C.

A group of devices such as a preceding vehicle detection device 20 that detects a preceding vehicle LC that precedes the vehicle C, a driving support device 30 that executes a route guidance based on map information 30a, and a white line detection device 40 that detects a white line on a road may be mounted on the vehicle C. For the preceding vehicle detection device 20, any means can be used that uses, for example, a millimeter-wave radar, a camera, or the like.

The visual line detection device 10 is provided so as to be capable of communicating with any of the on-vehicle camera 2, the group of sensors such as the steering angle sensor 3 to the brightness sensor 6, and the group of devices such as the preceding vehicle detection device 20 to the white line detection device 40.

The visual line detection device 10 also includes a control unit 11, a storage unit 12, and a detection unit 13. The storage unit 12 is a storage device such as a hard disk drive, a non-volatile memory, or a register.

The control unit 11 is, for example, a CPU, and reads out and executes a program (illustration omitted) stored in the storage unit 12, thereby functioning as, for example, respective functional blocks 11a to 11d illustrated in FIG. 2. Next, the respective functional blocks 11a to 11d will be described.

The control unit 11 includes an acquisition unit 11a, a determination unit 11b, a calculation unit 11c, and a calibration unit 11d.

The acquisition unit 11a acquires a running state of the vehicle C. Specifically, the acquisition unit 11a acquires various types of information regarding a running state of the vehicle C, such as image-taking information, sensing information, or output information of each in the group of devices, from the on-vehicle camera 2, the group of sensors such as the steering angle sensor 3 to the brightness sensor 6, or the group of devices such as the preceding vehicle detection device 20 to the white line detection device 40, as described above. The acquisition unit 11a informs the determination unit 11b of the acquired various types of information.

The determination unit 11b analyzes a running state of the vehicle C that is acquired by the acquisition unit 11a, and determines whether or not such a running state is a state where it is estimated that the driver D is gazing at a particular position, based on an analysis result. A specific example of a content of such determination will be described later, by using FIG. 6A to FIG. 7D.

If the running state is a state where it is estimated that the driver D is gazing at a particular position, the determination unit 11b causes the calculation unit 11c to calculate a representative value for a detection result from the detection unit 13 in such a state and causes the calibration unit 11d to execute calibration with such a representative value that is a reference thereof.

If the running state is a state where it is estimated that the driver D is not gazing at a particular position, the determination unit 11b newly receives a running state from the acquisition unit 11a and repeatedly executes analyzing and determining processes.

The calculation unit 11c calculates, as needed, a visual line direction and a visual line position of the driver D based on a detection result from the detection unit 13 that has the infrared camera 13a and the infrared LED 13b. A visual line position corresponds to a point of intersection of a visual line direction with the virtual plane V described above. An interval of such calculation is, for example, approximately several tens per second.

If the determination unit 11b determines that the running state is a state where it is estimated that the driver D is gazing at a particular position, the calculation unit 11c calculates a representative value for a visual line direction of the driver D in such a state.

Figure 3:
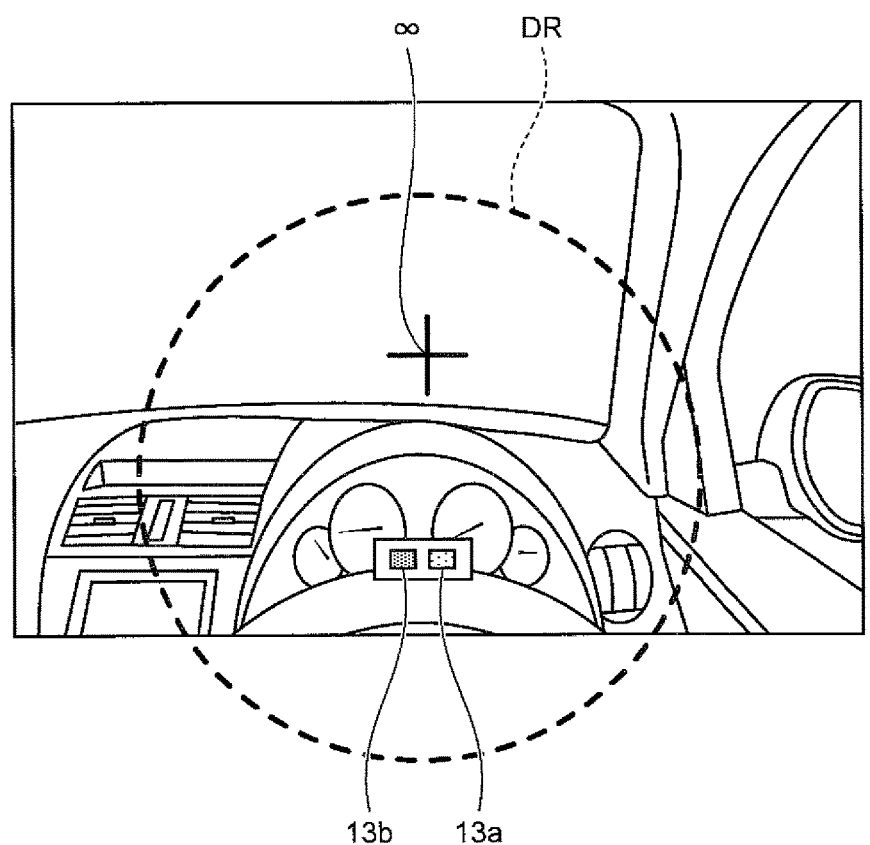
FIG. 3 is a diagram illustrating an example of arrangement of an infrared camera and an infrared LED.

Herein, specific contents of processes to be executed by the detection unit 13 and the calculation unit 11c will be described by using FIG. 3 to FIG. 5. FIG. 3 is a diagram illustrating an example of arrangement of the infrared camera 13a and the infrared LED 13b. FIG. 4A to FIG. 4D are diagrams (part 1 to part 4) illustrating a visual line direction detection process by the detection unit 13 and the calculation unit 11c. FIG. 5 is a diagram illustrating an example of data plotted on the virtual plane V.

As illustrated in FIG. 3, the infrared camera 13a and the infrared LED 13b in the detection unit 13 are provided, for example, above a steering column of a driver's seat of the vehicle C in such a manner that a face of the driver D is included in an image-taking region.

The infrared camera 13a and the infrared LED 13b that are thus provided have a visual line detectable region DR, for example, as illustrated in FIG. 3. The visual line detectable region DR is, for example, a region of ±20 to 30° with the infrared camera 13a being at a center thereof.

Although the visual line detectable region DR is illustrated by a perfect circle in FIG. 3, a shape thereof is not limited thereto. The visual line detectable region DR, of course, includes a point at infinity ∞ that is at a "particular position" in the present embodiment.

Figure 4A:
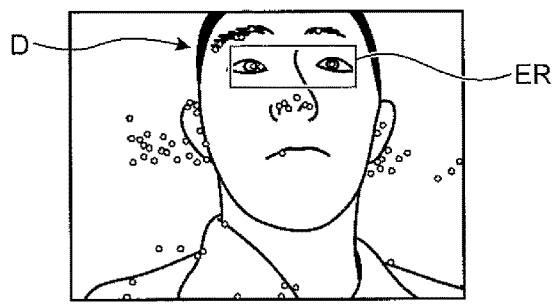
FIG. 4A to FIG. 4D are diagrams (part 1 to part 4) illustrating a visual line direction detection process by a detection unit and a calculation unit.
Figure 5:
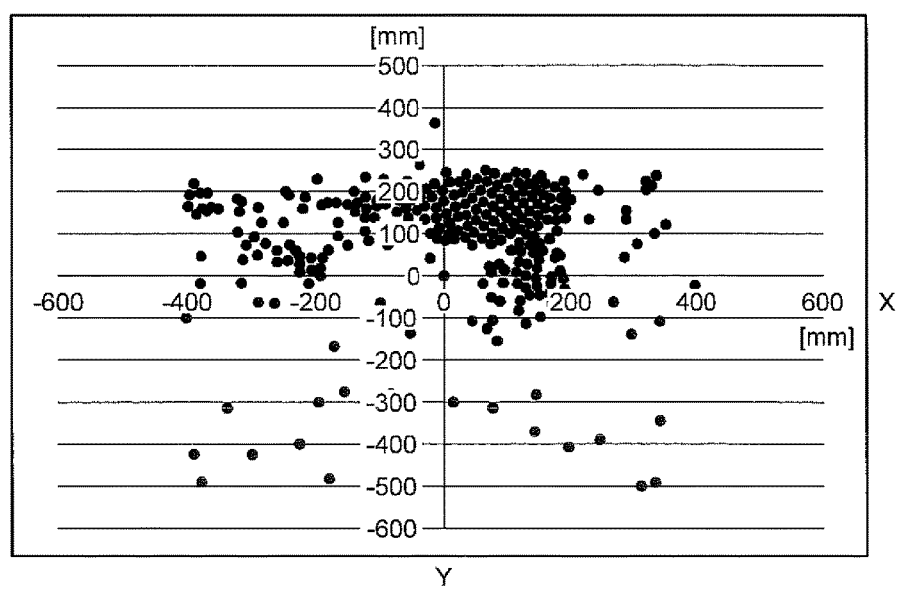
FIG. 5 is a diagram illustrating an example of data plotted on a virtual plane.

Due to the infrared camera 13a and the infrared LED 13b that are thus provided, first, an infrared image that includes a face of the driver D is input to the calculation unit 11c, and as illustrated in FIG. 4A, the calculation unit 11c detects an eye region ER by, for example, a publicly known image analyzation method.

Figure 4B:
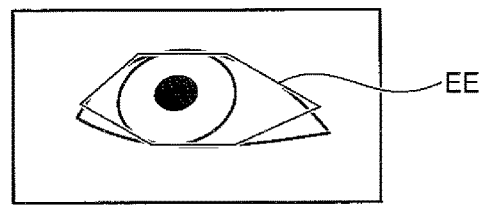
Figure 4C:
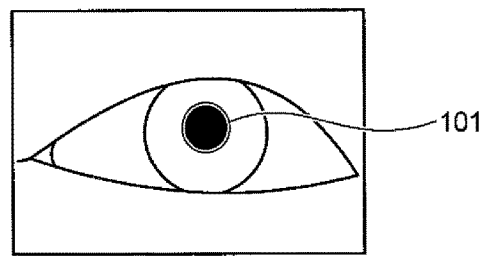
Figure 4D:
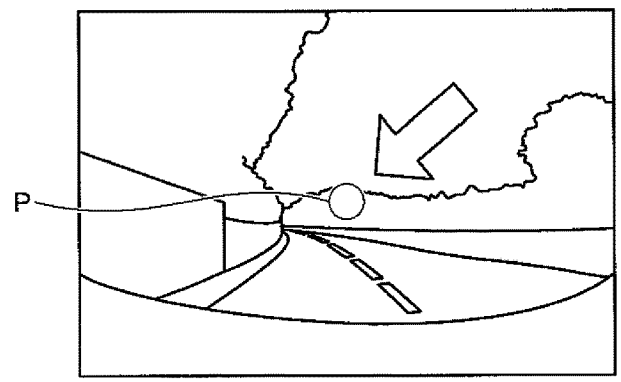

Subsequently, the calculation unit 11c detects an eye contour EE as illustrated in FIG. 4B and subsequently, detects a pupil 101 as illustrated in FIG. 4C.

Subsequently, the calculation unit 11c calculates a center of the pupil 101 by, for example, the method having already been illustrated in FIG. 1C or the like, and calculates a visual line direction of the driver D based on such a center of the pupil 101. This is executed for both eyes of the driver D. Then, the calculation unit 11c calculates a visual line position of the driver D (for example the point P in FIG. 4D) in the visual line detectable region DR based on thus calculated visual line direction.

Then, if the determination unit 11b determines that the running state is a state where it is estimated that the driver D is gazing at a particular position, the calculation unit 11c plots a visual line position P of driver D in such a state onto an XY-coordinate system on the virtual plane V (see, for example, FIG. 5).

Then, the calculation unit 11c obtains a center of a distribution of data plotted on such an XY-coordinate system and thereby calculates a representative value. The representative value as described above is, for example, an average value, and is not limited thereto, where for example, a median value or a mode value may be used or calculation thereof may be executed based on distances from all of the plotted data.

By referring back to the illustration of FIG. 2, the calculation unit 11c will be described subsequently. The calculation unit 11c informs the calibration unit 11d of the calculated representative value.

Based on the representative value informed of from the calculation unit 11c, the calibration unit 11d executes calibration with such a representative value that is a reference thereof. The calibration unit 11d updates calibration information 12a in the storage unit 12 every time such calibration is executed.

The calibration information 12a is information regarding calibration for the driver D, and as having already been described, is information that includes, for example, mapping information that indicates a positional relationship between the pupil 101 and the corneal reflection 102 of the driver D in the visual line detectable region DR.

Next, a specific content of a determination process to be executed by the determination unit 11b described above will be described by using FIG. 6A to FIG. 7D. FIG. 6A to FIG. 6E are diagrams (part 1 to part 5) illustrating cases where the determination unit 11b causes the calibration unit 11d to execute calibration. On the other hand, FIG. 7A to FIG. 7D are diagrams (part 1 to part 4) illustrating cases where the determination unit 11b causes the calibration unit 11d to execute no calibration.

That is, FIG. 6A to FIG. 6E illustrate cases where the determination unit 11b determines that the running state is a state where it is estimated that the driver D is gazing at a particular position. In contrast on the other hand, FIG. 7A to FIG. 7D illustrate cases where it is determined that the running state is a state where it is not estimated that the driver D is gazing at a particular position.

Figure 6A:
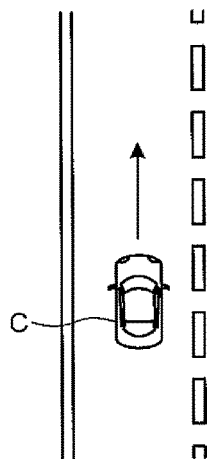
FIG. 6A to FIG. 6E are diagrams (part 1 to part 5) illustrating cases where a determination unit causes a calibration unit to execute calibration.

A particular position in the present embodiment indicates a "point at infinity ∞ in a front direction of the driver D in a case where it is assumed that the vehicle C is traveling straight on a flat or non-slope and straight road", and hence, the determination unit 11b basically determines whether or not the vehicle C is traveling straight on such a straight road as illustrated in FIG. 6A.

Figure 6B:
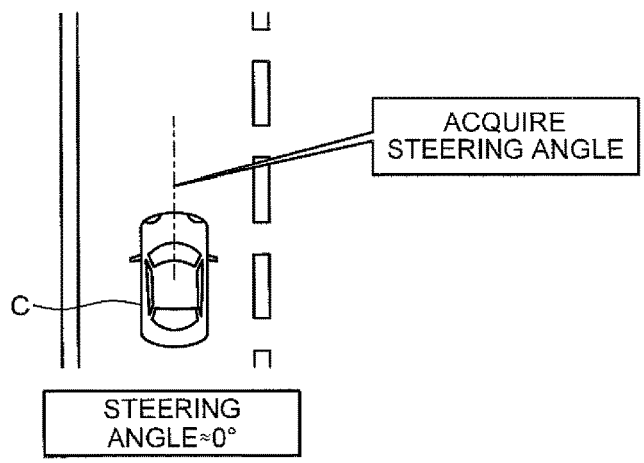

Specifically, as illustrated in FIG. 6B, the determination unit 11b, based on a steering angle acquired by the acquisition unit 11a from the steering angle sensor 3, determines that the vehicle C is traveling straight on a straight road if such a steering angle is approximately 0° (steering angle ≈0°), and causes the calibration unit 11d to execute calibration.

Figure 6C:
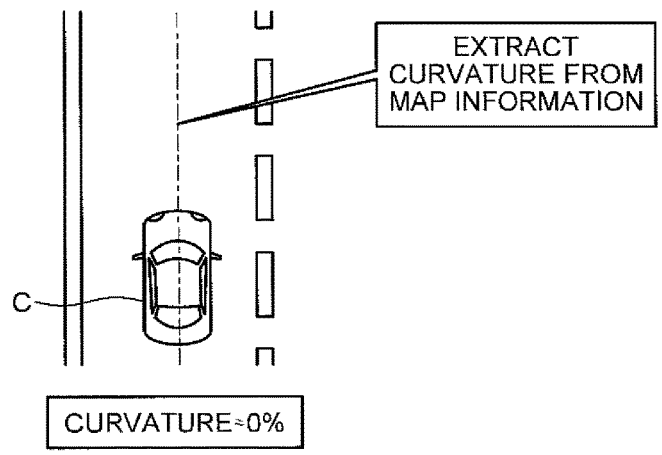

Alternatively, for example, as illustrated in FIG. 6C, the determination unit 11b, based on the map information 30a acquired by the acquisition unit 11a from the driving support device 30, extracts a curvature of a road with the vehicle C that is running, from such map information 30a. Then, if such a curvature is approximately 0% (curvature ≈0%), the determination unit 11b determines that the vehicle C is traveling straight on a straight road, and causes the calibration unit 11d to execute calibration.

Figure 6D:
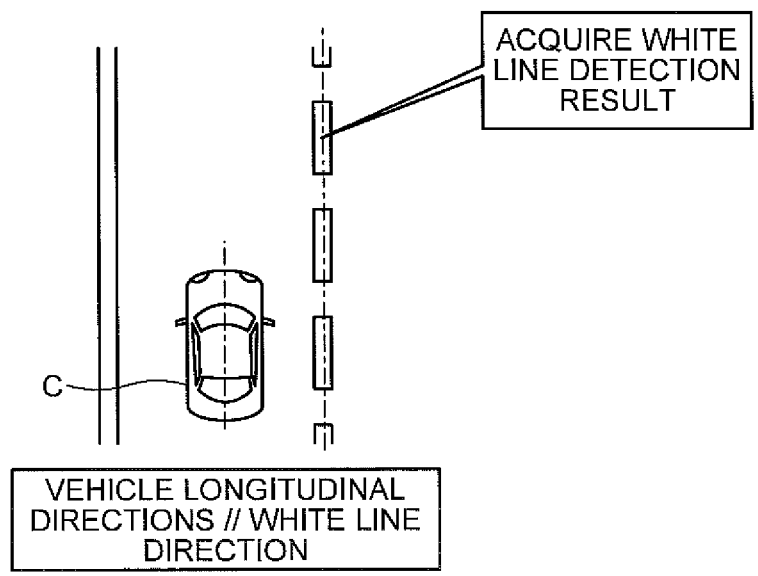

Alternatively, for example, as illustrated in FIG. 6D, the determination unit 11b, based on a detection result acquired by the acquisition unit 11a from the white line detection device 40, determines that the vehicle C is traveling straight on a straight road if a longitudinal direction of the vehicle C is substantially parallel to a direction of a white line (vehicle longitudinal direction//white line direction), and causes the calibration unit 11d to execute calibration.

Figure 6E:
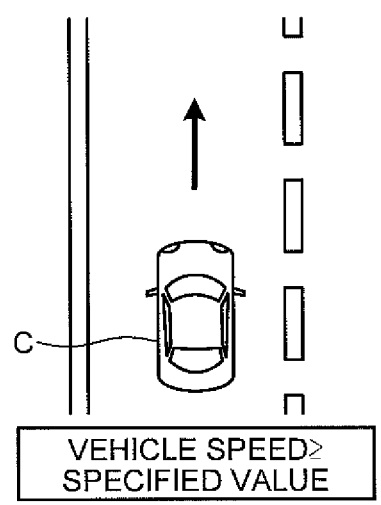

Alternatively, for example, as illustrated in FIG. 6E, the determination unit 11b, based on a vehicle speed acquired by the acquisition unit 11a from the vehicle speed sensor 4, determines that the vehicle C is running straight on a straight road if such a vehicle speed is greater than or equal to a specified value that is preliminarily specified (vehicle speed≥specified value), and causes the calibration unit 11d to execute calibration.

Herein, a specified value is, for example, approximately 100 km/h. A specified value is not limited to a vehicle speed and may be based on, for example, acceleration acquired from the acceleration sensor 5.

Alternatively, the determination unit 11b may calculate an evaluation value that indicates a relative relationship between the vehicle C and the preceding vehicle LC based on a detection result acquired by the acquisition unit 11a from the preceding vehicle detection device 20, and further, evaluates such an evaluation value, thereby determining whether or not calibration can be executed by the calibration unit 11d.

Figure 7A:
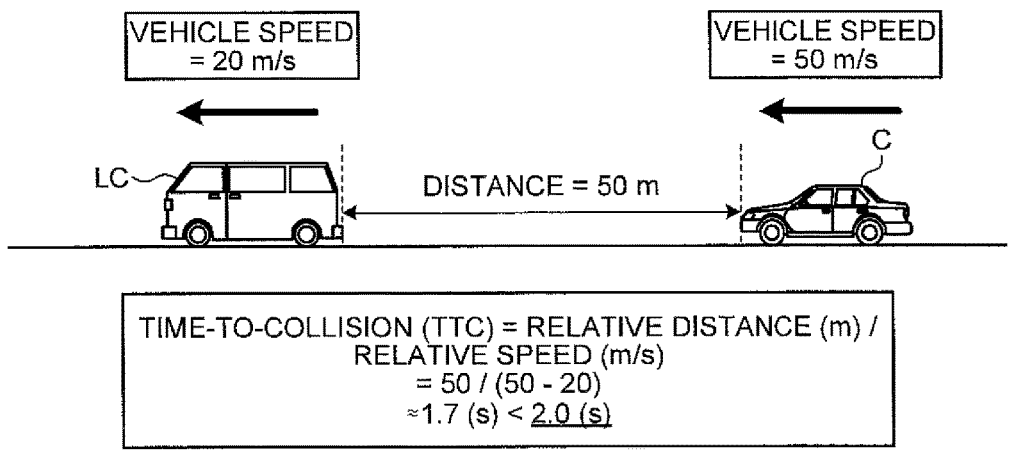
FIG. 7A to FIG. 7D are diagrams (part 1 to part 4) illustrating cases where a determination unit causes a calibration unit to execute no calibration.

For example, as illustrated in FIG. 7A, the vehicle C is traveling straight and the preceding vehicle LC is present ahead of such a vehicle C. Although the vehicle C is traveling straight, if the preceding vehicle LC is present, and for example, the preceding vehicle LC is close to or gradually approaches the vehicle C, the driver D in the vehicle C readily causes a visual line to vary. That is, a state where it is difficult for driver D to gaze at a particular position can occur.

In such a case, whether or not calibration can be executed by the calibration unit 11d can be determined by calculating an evaluation value that indicates a relative relationship between the vehicle C and the preceding vehicle LC and evaluating such an evaluation value, as described above.

Specifically, for an evaluation value, for example, a so-called time-to-collision (TTC) can be used. Specifically, as illustrated in FIG. 7A, for example, a vehicle speed of the vehicle C=50 m/s is provided and a vehicle speed of the preceding vehicle LC=20 m/s is provided. Also, a distance between them=50 m is provided. That is, a running state is such that the vehicle C further approaches the preceding vehicle LC from a distance of 50 m if continuing to travel straight.

In such a case, the time-to-collision (TTC) to be used as an evaluation value can be obtained by relative distance (m)/relative speed (m/s), and hence, is 50/(50−20≈1.7 (s). Herein, if a TTC where it is impossible for the driver D to gaze at a point at infinity ∞ is assumed to be, for example, 2 seconds or less and a specified value of "2.0 (s)" is preliminarily specified, "1.7 (s)<2.0 (s)" is provided herein, and hence, the determination unit 11b causes the calibration unit 11d to execute no calibration.

Figure 7B:
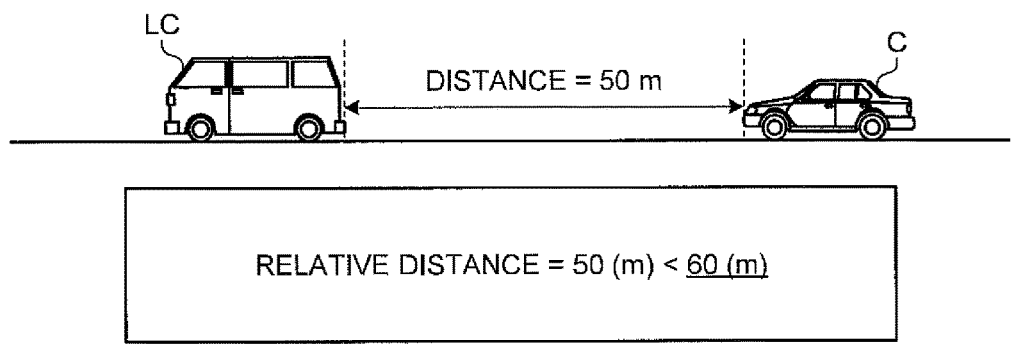

For an evaluation value that indicates a relative relationship between the vehicle C and the preceding vehicle LC, only a relative distance may merely be used. For example, as illustrated in FIG. 7B, a distance between the vehicle C and the preceding vehicle LC=50 m is provided.

Herein, if a relative distance where it is impossible for the driver D to gaze at a point at infinity ∞ is assumed to be 60 m or less and a specified value of "60 (m)" is preliminarily specified, "50 (m)<60 (m)" is provided herein, and hence, the determination unit 11b causes the calibration unit 11d to execute no calibration.

Depending on a running state, a destabilization factor that causes a visual line of the driver to vary, in other words, destabilizes the visual line, may be included in a field of view of the driver D.

Figure 7C:
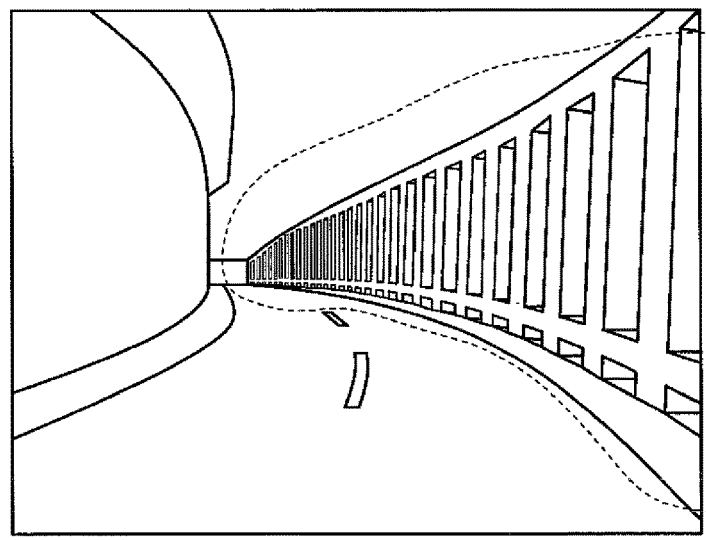
Figure 7C:

An example thereof is illustrated in FIG. 7C. A road illustrated in FIG. 7C is such that the driver D could gaze at a point at infinity cc if attention was paid to only a route shape of the road, but such a road is such that poles and spaces are alternately present at a right side and greatly change brightness at a right side of a field of view of the driver D.

In such a case, a visual line of the driver D tends to shift to a left side of a field of view, and hence, it is difficult to consider that a state is provided in such a manner that the driver D gazes at a point at infinity ∞. Therefore, in such a case, the determination unit 11b deals with a region enclosed by a broken line in the drawing as a destabilization region (one of destabilization factors) that destabilizes a visual line of the driver D. If such a destabilization region is included in a field of view of the driver D, the determination unit 11b determines that such a destabilization region is not suitable for calibration, and causes the calibration unit 11d to execute no calibration.

It is possible to determine whether or not such a destabilization region is included in a field of view of the driver D, based on, for example, an image taken by the on-vehicle camera 2 and a detection result from the brightness sensor 6.

Figure 7D:
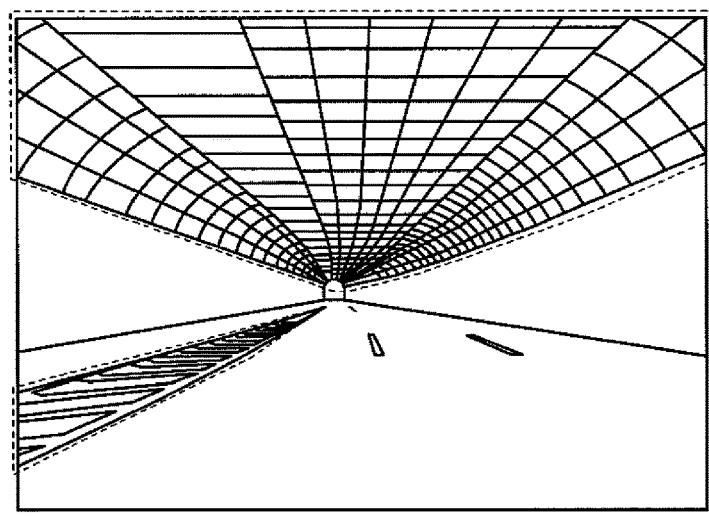
Figure 7D:

Another example that includes a destabilization region is illustrated in FIG. 7D. A substantially straight road illustrated in FIG. 7D is such that the driver D could readily gaze at a point at infinity co if attention was paid to only a route shape of the road, but such a road is such that a gird-like roof with a light transparency is present at an upper side and greatly change brightness at an upper side of a field of view of the driver D.

In such a case, a visual line of the driver D tends to shift to a lower side of a field of view, and hence, it is also difficult to consider that a state is provided in such a manner that the driver D gazes at a point at infinity ∞. Therefore, also in such a case, the determination unit 11b deals with a region enclosed by a broken line in the drawing as a destabilization region, and if such a destabilization region is included in a field of view of the driver D, such a destabilization region is not suitable for calibration, and the calibration unit 11d is caused to execute no calibration.

Although cases where the determination unit 11b uniformly causes the calibration unit 11d to execute no calibration if a destabilization factor is included in a field of view of the driver D have ever been described, calibration may be executed, for example, exceptionally.

Figure 8A:
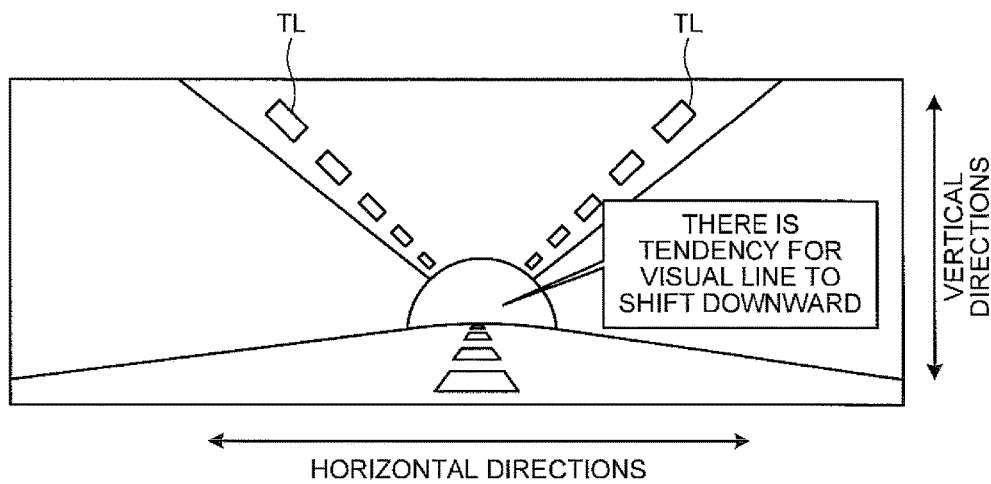
FIG. 8A and FIG. 8B are diagrams (part 1 and part 2) illustrating cases where a determination unit causes a calibration unit to execute calibration exceptionally.
Figure 8B:
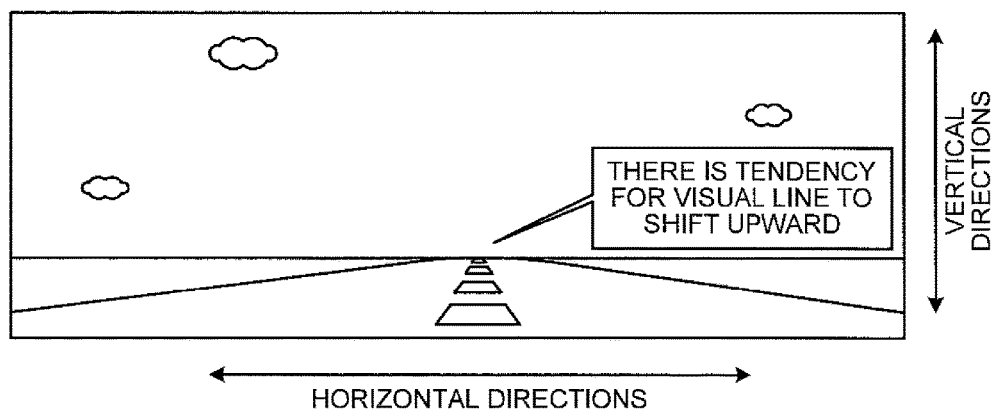

Such cases will be described by using FIG. 8A and FIG. 8B. FIG. 8A and FIG. 8B are diagrams (part 1 and part 2) illustrating cases where the determination unit 11b causes the calibration unit 11d to execute calibration exceptionally.

A straight road in a tunnel is illustrated in FIG. 8A. As illustrated in FIG. 8A, tunnel lights TL are frequently arranged on a ceiling of a tunnel at a predetermined interval along the tunnel. Therefore, in a case where the vehicle C is running in a tunnel, the driver D receives a brightness change at an upper side of a field of view that is caused by the tunnel lights TL and tends to shift the visual line downward.

That is, a tunnel ceiling corresponds to the destabilization region described above, and as described above, is not suitable for calibration, so that it is possible to cause the calibration unit 11d to execute no calibration.

However, as a point of view is changed, a tunnel is frequently generally linear and provides a less probability of looking aside that causes the driver D to look aside or to a left side and/or a right side, so that it is also possible to consider that the tunnel is suitable for calibration. Accordingly, the calibration unit 11d may exceptionally be caused to execute calibration in only a vertical direction or a horizontal direction.

For example, in a case of the tunnel illustrated in FIG. 8A, a destabilization factor (tunnel lights TL) that causes the driver D to shift a visual line downward is present at an upper side of a field of view of the driver D, and hence, it is sufficient to execute calibration in only a horizontal direction without executing calibration in a vertical direction.

If calibration is not executed in a limited direction but, for example, a distribution of a visual line is shifted due to a destabilization factor, calibration may be executed by estimating an amount of such a shift with respect to a particular position and offsetting a representative value as described above depending on such an amount of a shift of the particular position.

Specifically, if a visual line of the driver D tends to shift downward and a distribution of the visual line is shifted to a lower side in the tunnel illustrated in FIG. 8A, calibration may be executed by estimating an amount of such a shift and offsetting a representative value that is a center of the distribution to an upper side depending on the amount of such a shift.

Thereby, even in a case where a destabilization factor is included in a field of view of the driver D, if a factor suitable for calibration is yet included in a running state, calibration can be executed by compensating for an amount of a shift caused by the destabilization factor.

FIG. 8B illustrates an example of a running state in contrast with that illustrated in FIG. 8A and is a straight road with outside open space. In such a case, the driver D tends to shift a visual line upward. This is because a change of brightness or the like at a lower side of a field of view of the driver D is greater than that at an upper side thereof.

Therefore, in a case of the example illustrated in FIG. 8B, it is considered that a destabilization factor that causes the driver D to shift a visual line upward is present at a lower side of a field of view of the driver D, and hence, it is sufficient to execute calibration only in a horizontal direction without executing calibration in a vertical direction.

If a visual line of the driver D tends to shift upward and a distribution of the visual line is shifted to an upper side, calibration may be executed by estimating an amount of such a shift and offsetting a representative value that is a center of the distribution to a lower side depending on the amount of such a shift.

Figure 9B:
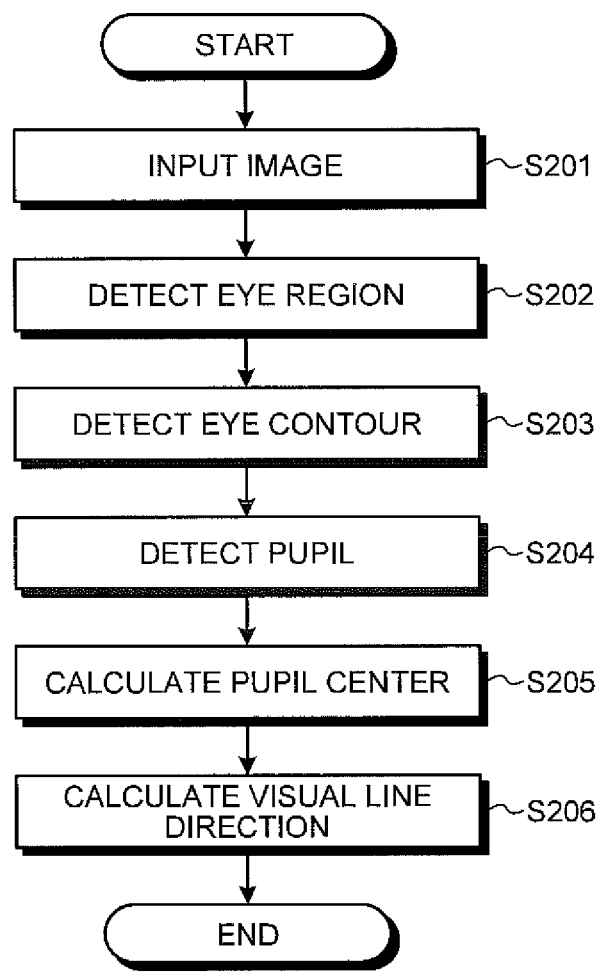
FIG. 9B is a flowchart illustrating steps of a visual line direction detection process.

Next, steps of a process to be executed by the visual line detection device 10 according to the embodiment will be described by using FIG. 9A and FIG. 9B. FIG. 9A is a flowchart illustrating steps of a process to be executed by the visual line detection device 10 according to the embodiment. FIG. 9B is a flowchart illustrating steps of a visual line direction detection process. In FIG. 9A, illustration of the case where calibration is executed exceptionally as described above is omitted.

As illustrated in FIG. 9A, the visual line detection device 10 executes a visual line direction detection process (Step S101). Such a visual line direction detection process is repeatedly executed in parallel with a process in step S102 and subsequent thereto.

As illustrated in FIG. 9B, in the visual line direction detection process, first, the calculation unit 11c inputs, from the detection unit 13, an infrared image provided by the infrared camera 13a and the infrared LED 13b (step S201). Then, the calculation unit 11c detects the eye region ER from the infrared image (step S202).

Subsequently, the calculation unit 11c detects the eye contour EE (step S203) and further detects the pupil 101

(step S204). Then, the calculation unit 11c calculates a center of the pupil 101 (step S205).

Then, the calculation unit 11c calculates a visual line direction from a positional relationship between the center of the pupil 101 and the corneal reflection 102 (step S206) and ends such a single visual line direction detection process.

By referring back to the illustration of FIG. 9A, step S102 will be described. In step S102, the acquisition unit 11a acquires a running state of the vehicle C. Then, the determination unit 11b analyzes such a running state (step S103).

Subsequently, the determination unit 11b determines, from an analysis result, whether or not the state is such that it is estimated that the driver D is gazing at a particular position (step S104). If such a determination condition is satisfied (step S104, Yes), the calculation unit 11c calculates a representative value for a result of visual line direction detection in the above-mentioned state (step S105).

Then, the calibration unit 11d executes calibration with the representative value that is a reference thereof (step S106). On the other hand, if the determination condition at step S104 is not satisfied (step S104, No), the calibration unit 11d executes no calibration (step S107).

Then, the visual line detection device 10 ends such a single calibration process. Therefore, the steps of a process in the flowchart illustrated in FIG. 9A are repeatedly executed every time whether or not calibration can be executed is called.

As having been described above, a visual line detection device according to the embodiment includes a detection unit, an acquisition unit, a determination unit, a calculation unit, and a calibration unit. The detection unit determines a visual line direction of a driver in a vehicle. The acquisition unit acquires a running state of the vehicle. The determination unit determines whether or not the running state acquired by the acquisition unit is a gazing state where it is estimated that the driver is gazing at a particular position.

The calculation unit calculates a representative value for a detection result from the detection unit in a case where the determination unit determines that the running state is the gazing state. The calibration unit executes calibration for detection of the visual line direction by the detection unit in such a manner that the representative value calculated by the calculation unit is a reference thereof.

Therefore, due to a visual line detection device according to the embodiment, simple and highly accurate visual line detection can be executed.

In the embodiment described above, a case where a visual line direction is detected based on a positional relationship between a pupil and a corneal reflection of a driver is provided as an example and is not limited thereto. For example, an image of an eye of a driver may be taken by a visible light camera, where an inner corner of eye may be a reference point and a visual line direction may be detected based on a position of an iris with respect to such an inner corner of eye.

In the embodiment described above, a case where calibration is executed for only a running vehicle is provided as an example and is not limited thereto. For example, for first calibration for each driver, calibration may be executed on a condition that a vehicle is stopped, by a method similar to a publicly known method that is a comparative example, and calibration information obtained thereby may preliminarily be stored in a storage unit as initial setting information.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A visual line detection device, comprising:
   a detection unit that detects a visual line direction of a driver in a vehicle;
   an acquisition unit that acquires a running state of the vehicle;
   a determination unit that determines whether or not the running state acquired by the acquisition unit is a gazing state where the driver is gazing at a particular position;
   a calculation unit that calculates a representative value for a detection result of the detection unit in a case where the determination unit determines that the running state is the gazing state; and
   a calibration unit that executes calibration for detection of the visual line direction by the detection unit in such a manner that the representative value calculated by the calculation unit is a reference thereof.

2. The visual line detection device according to claim 1, wherein the determination unit causes a point at infinity in a front direction of the driver in a case where it is assumed that the vehicle is traveling straight on a flat and straight road or a vanishing point of a road to be the particular position.

3. The visual line detection device according to claim 2, wherein:
   the acquisition unit acquires a detection result of a preceding vehicle detection device mounted on the vehicle and
   the determination unit calculates an evaluation value that indicates a relative relationship between the vehicle and a preceding vehicle based on a detection result of the preceding vehicle detection device and further evaluates the evaluation value, thereby determining whether or not the calibration can be executed by the calibration unit.

4. The visual line detection device according to claim 2, wherein the calibration unit executes the calibration in a case where the vehicle is traveling straight.

5. The visual line detection device according to claim 4, wherein:
   the acquisition unit acquires a steering angle of the vehicle;
   the determination unit determines whether or not the vehicle is traveling straight based on the steering angle; and
   the calibration unit executes the calibration in a case where the determination unit determines that the vehicle is traveling straight.

6. The visual line detection device according to claim 4, wherein:
   the acquisition unit acquires map information in a case where a driving support device that executes a route guidance based on the map information is mounted on the vehicle;
   the determination unit extracts information that includes a curvature of a road with the vehicle being running thereon from the map information and further determines whether or not the vehicle is traveling straight based on information that includes the curvature; and
   the calibration unit executes the calibration in a case where the determination unit determines that the vehicle is traveling straight.

7. The visual line detection device according to claim 4, wherein:
the acquisition unit acquires a detection result of a white line detection device that detects a white line on a road in a case where the white line detection device is mounted on the vehicle;
the determination unit determines whether or not the vehicle is traveling straight based on a detection result of the white line detection device; and
the calibration unit executes the calibration in a case where the determination unit determines that the vehicle is traveling straight.

8. The visual line detection device according to claim 2, wherein:
the acquisition unit acquires at least one of speed and acceleration of the vehicle;
the determination unit determines that the vehicle is traveling straight in a case where at least one of the speed and the acceleration is greater than a specified value that is preliminarily specified for each of the speed and the acceleration; and
the calibration unit executes the calibration in a case where the determination unit determines that the vehicle is traveling straight.

9. The visual line detection device according to claim 1, wherein the determination unit determines whether or not a destabilization factor that destabilizes a visual line direction of the driver is included in a field of view of the driver, based on the running state acquired by the acquisition unit.

10. The visual line detection device according to claim 9, wherein the calibration unit does not execute the calibration in a case where the determination unit determines that the destabilization factor is included in the field of view.

11. The visual line detection device according to claim 9, wherein the calibration unit executes the calibration for the field of view in a direction with the destabilization factor being not included therein, in a case where the determination unit determines that the destabilization factor is included in the field of view.

12. The visual line detection device according to claim 9, wherein the calibration unit executes the calibration with the representative value that is offset depending on an amount of shift of the particular position that is estimated to be caused by the stabilization factor, in a case where the determination unit determines that the destabilization factor is included in the field of view.

13. A visual line detection method, comprising:
detecting a visual line direction of a driver in a vehicle;
acquiring a running state of the vehicle;
determining whether or not the running state acquired is a gazing state where the driver is gazing at a particular position;
calculating a representative value for a detection result of the visual line direction in a case where it is determined that the running state is the gazing state; and
executing calibration for detection of the visual line direction in such a manner that the representative value calculated is a reference thereof.

* * * * *